No. 642,999. Patented Feb. 6, 1900.
C. D. O'NEIL.
NUT LOCK.
(Application filed Dec. 7, 1899.)
(No Model.)
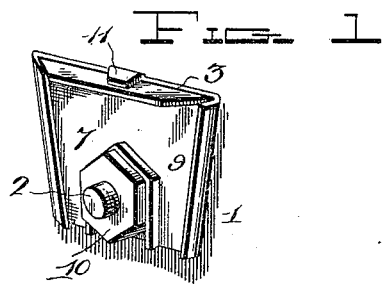
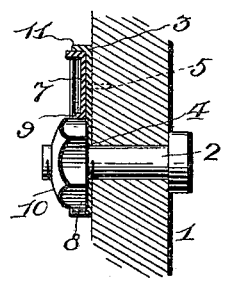
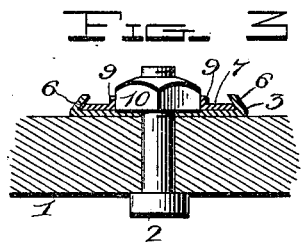
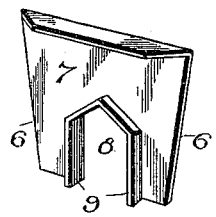
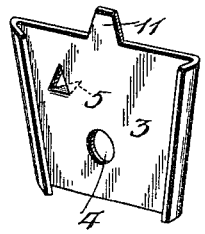
Witnesses
Inventor
C. D. O'Neil,
by H. B. Willson & Co.
Attorneys
THE NORRIS PETERS CO., PHOTO-LITHO., WASHINGTON, D. C.

UNITED STATES PATENT OFFICE.

CHARLES D. O'NEIL, OF CHARLESTON, WEST VIRGINIA.

NUT-LOCK.

SPECIFICATION forming part of Letters Patent No. 642,999, dated February 6, 1900.

Application filed December 7, 1899. Serial No. 739,520. (No model.)

*To all whom it may concern:*

Be it known that I, CHARLES D. O'NEIL, a citizen of the United States, residing at Charleston, in the county of Kanawha and State of West Virginia, have invented certain new and useful Improvements in Nut-Locks; and I do declare the following to be a full, clear, and exact description of the invention, such as will enable others skilled in the art to which it appertains to make and use the same.

The invention relates to a nut-lock.

The object of the invention is to provide a simple, durable, and inexpensive device of this character for locking nuts against accidental displacement from their bolts and at the same time permitting of the removal of the nut when occasion requires.

To this end the invention consists in certain features of construction and combination of parts, which will be hereinafter fully described and claimed.

In the accompanying drawings, Figure 1 is a perspective view of my improved nut-lock. Fig. 2 is a longitudinal sectional view. Fig. 3 is a cross-sectional view. Fig. 4 is a detail perspective view of the locking-wedge. Fig. 5 is a similar view of the flanged plate.

In the drawings the same reference characters indicate the same parts of the invention.

1 denotes a piece of material through which the bolt 2 extends. This may be a fish-plate or a railroad-rail or may be a part of a wooden structure.

3 denotes the flanged plate, which is provided with a central aperture 4 to receive the bolt 2 and with a penetrating tongue 5 to engage the recess in the piece 1 and prevent rotation of the plate about the bolt. The side flanges of the plate converge from the upper edge of the plate to the lower edge and receive the tapering edges 6 of the wedged locking-plate 7, which is provided with a central recess 8, having flanged edges 9 to embrace the sides of the nut 10. The upper end of the wedge-plate may be also flanged and is adapted to be engaged by a lip 11, formed on the upper edge of the flanged plate, so that the wedge-plate will not accidentally withdraw from its position between the side flanges of the plate.

In use after the bolt has been inserted through the piece 1 and the central aperture of the flanged plate and the pentrating lip engaged with the recess in the part 1 the nut is screwed home upon the bolt. The wedge-plate is now driven downwardly between the side flanges of the flanged plate, with the flanges of said wedge-plate engaging the sides of the nut. The lip 11 at the upper end of the flanged plate is now bent over the upper edge of the wedge-plate, and in this position the wedge is firmly and securely locked to the nut and the nut prevented from turning.

When it is desired to remove the bolt, the lip 11 is forced back to disengage it from the upper edge of the wedge-plate, which may now be withdrawn to permit of the unscrewing of the nut from the bolt.

From the foregoing description, taken in connection with the accompanying drawings, the construction, operation, and advantages of my invention will be readily apparent without requiring an extended explanation. It will be seen that the device is simple, that its construction permits of its manufacture at small cost, and that it is exceedingly well adapted for the purpose for which it is designed, and it will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

The combination with a flanged plate, the flanges of which converge from the upper to the lower edge, said plate being provided with an aperture and with two lips, one struck from the body of the plate within its marginal edges, and the other formed on one of the edges of the plate; of a locking-wedge having a recess formed in one of its edges and extending up a distance toward its opposite edge, the walls of said recess being formed with marginal flanges, substantially as and for the purpose set forth.

In testimony whereof I have hereunto set my hand in presence of two subscribing witnesses.

CHARLES D. O'NEIL.

Witnesses:
GEO. W. PATTEN,
E. C. JONES.